May 11, 1926. 1,584,528

J. G. GRAINGER

THERMOSTATIC COMPENSATOR FOR CHRONOMETERS AND WATCHES

Filed Feb. 20, 1925

WITNESSES
L. Goodyear
E. N. Lovewell

INVENTOR
James G. Grainger

BY [signature]

ATTORNEY

Patented May 11, 1926.

1,584,528

UNITED STATES PATENT OFFICE.

JAMES G. GRAINGER, OF RICHMOND, CALIFORNIA, ASSIGNOR TO GEORGE A. KNOX, OF OAKLAND, CALIFORNIA.

THERMOSTATIC COMPENSATOR FOR CHRONOMETERS AND WATCHES.

Application filed February 20, 1925. Serial No. 10,507.

This invention relates to horological instruments, particularly to chronometers, and has for its object the provision of thermostatic means for automatically varying or regulating the throw or arc of movement of the balance wheel, in accordance with variations in temperature conditions, whereby the chronometer will be rendered accurate regardless of any temperature changes to which it may be subjected even though they be of an extreme range.

An important object of the invention is the provision of a thermostatic control means which operates independently of the adjustment for the mean time, so that regulation as to mean time and as to the sensitiveness to temperature changes may be separately made, and not interfere.

Another object of the invention is the provision of a mechanism of this character which is mounted upon the balance bridge and directly associated with the balance wheel.

A further object of the invention is the provision of an apparatus of this character in which means is provided for readily varying the degree of movement of the ultimate control member under the influence of a certain degree of contraction or expansion of the thermostatic control element.

An additional object is the provision of a device for this purpose, which will be comparatively simple and inexpensive in manufacture, easy to install and adjust, positive in action, efficient and durable in service, and a general improvement in the art.

With the above and other objects and advantages in view, the invention may consist in the details of construction and arrangement of parts to be hereinafter more fully described and claimed, and illustrated in the accompanying drawing in which:—

Throughout the specification and drawings like parts are designated by like reference characters.

Referring more particularly to the drawings, the letter A designates the balance bridge and B the balance wheel of a chronometer. The letter C indicates the hair spring which has one end connected with a stud D. As is well known, adjustment of the balance wheel to make the chronometer run faster or slower is effected by moving a rotatable element E, having a lug or stud F thereon engaging the hair spring C for the purpose of varying the effective or operating length thereof.

Figure 1:
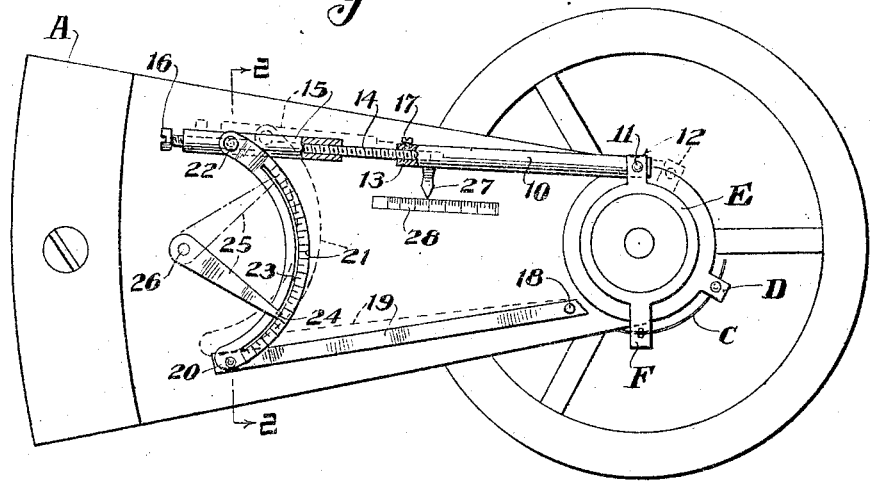
Figure 1 is an elevation of the preferred form of the invention applied to the balance bridge and connected with the balance wheel of a chronometer, a portion of the mechanism being broken away and in section.
Figure 2:
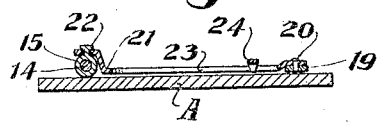
Figure 2 is a cross section on the line 2—2 of Figure 1.

Referring to Figures 1 and 2 in particular, I have illustrated a control means comprising a rod 10 pivotally connected at 11, with a lug 12 on the adjusting member E, and having a threaded bore 13 within which is engaged a screw 14 threaded through a sleeve 15. Beyond the sleeve, the screw terminates in a head 16, whereby it may be turned in one direction or the other to vary the adjustment, and the position of the screw with respect to the rod 10 may be maintained by means of a set-screw 17 or the like. The above described parts constitute the means for adjusting the mean time, though these parts also cooperate with the thermostatic means to be described.

Extending longitudinally of the bridge A and connected at one end thereto, as shown at 18, is a thermostatic element 19, which is constructed of such metal, metals or other materials as to be capable of expanding and contracting to an appreciable extent during a reasonable range in temperature variations. I have used as a thermostatic element, zinc. Pivotally connected at 20 with the other end of this thermostatic element, is an arcuate floating member 21, which is pivotally connected at 22 with the sleeve 15, and which consequently forms a support for the mean time adjusting device. The member 21 is formed with an arcuate slot 23, within which engages the laterally extending end 24 of an arm 25 pivoted at 26 upon the bridge, and adjustable to any point along the length of the member 21 to serve as a fulcrum. It is preferable that the member 21 be suitably calibrated to indicate degrees, so that the arm may be set to correspond with any desired temperature. It might be well to mention that as an added refinement or convenience, the rod 10 may carry a pointer 27 cooperating with a suitable scale 28 on the bridge, so that by turning the screw 14 the rod 10 may be shifted to the proper extent, as determined by the position of the pointer 27 with respect to the scale 28, so that the member E carrying the regulating stud or lug F will be shifted to adjust the mechanism for making the chronometer run faster or slower.

In the operation of the thermostatic control, it will be apparent that in case of an increase in temperature the member 19 will expand and consequently elongate, thereby rocking the floating member 21 upon the end 24 of the arm 25 as a pivot, the sleeve 15, screw 14 and rod 10 being consequently moved longitudinally in the other direction for moving the member E carrying the regulating stud F. Such a shifted position is indicated by dotted lines in Figure 1. It will be obvious that the degree of movement of the member 10 and associated parts, as the result of a certain change in temperature, will depend entirely upon the position of the pointer 25. If the pointer 25 be arranged at the center of the floating member 21, the members 10 and 19 will move correspondingly, whereas if the arm 25 be placed closer to the member 19, as indicated by full lines in Figure 1, the movement of the member 10 will be much greater than the movement of the member 19, while if the arm 25 be arranged closer to the pivot 22, as shown by dot and dash lines in Figure 1, a comparatively great degree of movement of the member 19 will cause very slight movement of the member 10. It is the adjustability of the arm 25 which consequently regulates the delicacy of the adjustment.

Figure 3:
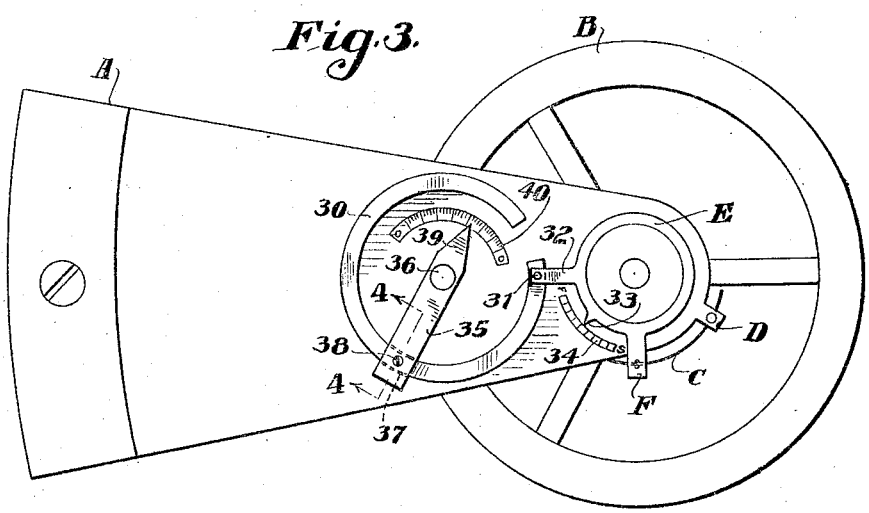
Figure 3 is a view similar to Figure 1, but showing a modification.
Figure 4:
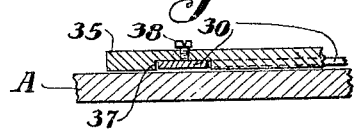
Figure 4 is a cross section on the line 4—4 of Fig. 3.

In Figures 3 and 4 I have illustrated a modification, in which the above described straight thermostatic element 19 is replaced by an element 30 of almost circular form, having one end connected at 31 with an arm 32 on the regulator corresponding to the above described lug 12. In this instance the mean time adjustment is effected by rotating the member E in one direction or the other by manual or other means, as is the ordinary practice, the member E carrying a pointer 33 cooperating with a scale 34.

The thermostatic control means includes an arm 35 pivoted at 36 upon the bridge, and formed with a slot or groove 37 on its underside slidably engaging upon the strip 30, and adapted to be secured in any desired position with respect thereto by a screw 38 or the like. The arm 35 terminates in a pointer 39 cooperating with a suitable scale 40.

In the operation of this form, it is evident that the effective length of the thermostatic element 30 is the governing feature, and that this length is varied in accordance with the position of the arm 35. Regardless of what the adjustment may be, it is quite clear that expansion of the member 30 under the influence of heat, will result in elongation thereof and rotation of the member E so that the proper adjustment of the hair spring will be obtained to compensate for the temperature change. In case of a drop in temperature, the member 30 will contract and the reverse action will occur.

From the foregoing description and a study of the drawings it will be apparent that I have thus provided a simply constructed, easily installed, and highly efficient mechanism for regulating the balance wheel of a watch or other chronometer to compensate for any and all temperature changes, so that the time-piece will be certain to keep accurate time and not be influenced by climatic changes.

While I have shown and described the preferred embodiments of the invention, it should be understood that the disclosure is merely illustrative, as the right is reserved to make all such changes in the form, construction and arrangement of parts as will widen the field of utility and increase the adaptability of the invention, provided such variations and modifications constitute no departure from the spirit of the invention or the scope of the claims hereunto appended.

What is claimed is:—

1. In a chronometer, the combination with the balance wheel carrying the hair spring, and having a rotatable regulator member connected with the hair spring, a thermostatic element connected with said regulator member, a pivoted arm serving as a pointer, and a scale over which the pointer travels, said arm being movable to vary the effective length of the thermostatic element.

2. In a chronometer, temperature change compensating means comprising the combination with the balance wheel and balance bridge, of a member rotatably mounted with respect to the balance wheel and connected with the hair spring of the balance wheel for varying the effective length thereof, a longitudinally movable member mounted on the bridge and connected with said rotatable member, a floating member, a thermostatic element mounted at one end on the bridge and having its other end connected with said floating member for moving the same, and a movably mounted fulcrum for the floating member, comprising an arm pivoted on the bridge, the floating member having an arcuate slot concentric with the pivot of said arm and engaging the free end thereof.

In testimony that I claim the foregoing as my own, I have hereto affixed my signature.

JAMES G. GRAINGER.